(12) United States Patent
Hsu et al.

(10) Patent No.: US 10,602,103 B2
(45) Date of Patent: Mar. 24, 2020

(54) WAVELENGTH CONVERSION WHEEL AND PROJECTION APPARATUS

(71) Applicant: Coretronic Corporation, Hsin-Chu (TW)

(72) Inventors: Pi-Tsung Hsu, Hsin-Chu (TW); Shang-Hsuang Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/143,491

(22) Filed: Sep. 27, 2018

(65) Prior Publication Data

US 2019/0104287 A1 Apr. 4, 2019

(30) Foreign Application Priority Data

Sep. 29, 2017 (CN) .......................... 2017 1 0910301

(51) Int. Cl.
| | |
|---|---|
| *H04N 9/31* | (2006.01) |
| *G02B 27/09* | (2006.01) |
| *G03B 21/14* | (2006.01) |
| *G03B 21/20* | (2006.01) |
| *G03B 33/08* | (2006.01) |

(52) U.S. Cl.
CPC ....... *H04N 9/3158* (2013.01); *G02B 27/0955* (2013.01); *G03B 21/142* (2013.01); *G03B 21/204* (2013.01); *G03B 21/2093* (2013.01); *G03B 33/08* (2013.01); *H04N 9/3114* (2013.01)

(58) Field of Classification Search
CPC .... G03B 21/28; G03B 21/142; G03B 21/145; G03B 21/204; F21V 13/02; F21V 13/08; F21V 13/12; F21V 13/14
See application file for complete search history.

(56) References Cited

U.S. PATENT DOCUMENTS

| | | | |
|---|---|---|---|
| 2005/0030659 A1 | 2/2005 | Asakawa | |
| 2012/0242912 A1* | 9/2012 | Kitano | H04N 9/3111 348/759 |
| 2014/0254133 A1* | 9/2014 | Kotter | C09K 11/02 362/84 |
| 2017/0111620 A1* | 4/2017 | Tian | H04N 9/3111 |
| 2017/0227192 A1* | 8/2017 | Ikeda | F21V 29/89 |
| 2017/0237953 A1* | 8/2017 | Akiyama | H04N 9/3114 353/31 |

FOREIGN PATENT DOCUMENTS

| | | |
|---|---|---|
| CN | 105431776 | 3/2016 |
| CN | 104865784 | 1/2017 |

* cited by examiner

*Primary Examiner* — Sultan Chowdhury

(74) *Attorney, Agent, or Firm* — JCIPRNET

(57) ABSTRACT

The disclosure provides a wavelength conversion wheel including a substrate, a first wavelength conversion layer, and a second wavelength conversion layer. The substrate has a rotation central axis. The first wavelength conversion layer is disposed on the substrate and has a first end. The second wavelength conversion layer is disposed on the substrate and has a second end. The second end is closely adjacent to the first end. An edge of the first end and an edge of the second end are complementary in shape, and a boundary formed between the edge of the first end and the edge of the second end is not parallel to a radial direction of the substrate, wherein the radial direction is perpendicular to an extension direction of the rotation central axis. A projection apparatus using the wavelength conversion wheel is further provided.

10 Claims, 5 Drawing Sheets

WAVELENGTH CONVERSION WHEEL AND PROJECTION APPARATUS

CROSS-REFERENCE TO RELATED APPLICATION

This application claims the priority benefit of China application serial no. 201710910301.1, filed on Sep. 29, 2017. The entirety of the above-mentioned patent application is hereby incorporated by reference herein and made a part of this specification.

BACKGROUND OF THE INVENTION

Field of the Invention

The invention relates to a wavelength conversion wheel and a projection apparatus, and in particular, to a wavelength conversion wheel and a projection apparatus that effectively decrease a discontinuity rate of a conversion light beam passed through the wavelength conversion wheel.

Description of Related Art

The projection apparatus is an optical apparatus commonly used on business or office occasions and in theaters. Generally, the projection apparatus includes an excitation light source and a wavelength conversion wheel. Light emitted by the excitation light source is converted into light of other wavelengths after passing through the wavelength conversion wheel, and the converted light of different wavelengths may be used to form color images by mixture for users to view. However, due to limitations on the process, the wavelength conversion wheel includes a plurality of fluorescence powder layers that are attached or coated in segment forms, and a gap generally exists on a boundary between two adjacent fluorescence powder layers. If the light emitted by the excitation light source is irradiated to this gap region, the wavelength cannot be converted, and a discontinuous conversion light beam is generated. Moreover, the two adjacent fluorescence powder layers sometimes partially overlap on the boundary, and if the light emitted by the excitation light source is irradiated to this overlapping region, a light beam of an undesired color will be generated, which causes limitations in application.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

Some embodiments of the invention provide a wavelength conversion wheel that effectively decreases a discontinuity rate of the emission of a conversion light beam passed through the wavelength conversion wheel.

Some embodiments of the invention provide a projection apparatus including the foregoing wavelength conversion wheel.

To achieve one, part, or all of the purposes above or other purposes, an embodiment of the invention provides a wavelength conversion wheel including a substrate, a first wavelength conversion layer, and a second wavelength conversion layer. The substrate has a rotation central axis and is adapted to rotate about the rotation central axis. The first wavelength conversion layer is disposed on the substrate and has a first end. The second wavelength conversion layer is disposed on the substrate and has a second end. The second end is closely adjacent to the first end. An edge of the first end and an edge of the second end are complementary in shape, and a boundary formed between the edge of the first end and the edge of the second end is not parallel to a radial direction of the substrate, wherein the radial direction is perpendicular to an extension direction of the rotation central axis.

The projection apparatus according to an embodiment of the invention includes an excitation light source, a light valve, a projection lens, and the foregoing wavelength conversion wheel. The excitation light source is adapted to provide an excitation light beam. The wavelength conversion wheel is disposed on a transmission path of the excitation light beam and is configured to convert the excitation light beam into a conversion light beam. The light valve is disposed on a transmission path of the conversion light beam and receives the conversion light beam to form an image light beam. The projection lens is disposed on a transmission path of the image light beam and receives the image light beam to form a projection light beam.

In light of the above, in the wavelength conversion wheel of the embodiments of the invention, the second end of the second wavelength conversion layer is closely adjacent to the first end of the first wavelength conversion layer, the edge of the first end and the edge of the second end are complementary in shape, and the boundary formed between the edge of the first end and the edge of the second end is not parallel to the radial direction of the substrate. Through the design above, a conversion rate of the excitation light beam irradiated on the first and second wavelength conversion layers of the wavelength conversion wheel is enhanced. Accordingly, the conversion light beam of excellent quality can be provided, and the overall performance of the projection apparatus can be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 6:
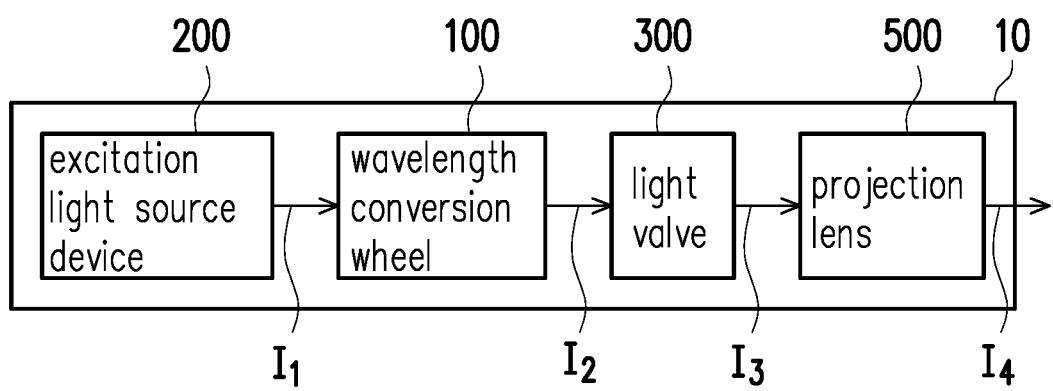
FIG. 6 is a schematic diagram illustrating a projection apparatus according to an embodiment of the invention.

FIG. 6 is a schematic diagram illustrating a projection apparatus according to an embodiment of the invention. Referring to FIG. 6, a projection apparatus 10 of the embodiment includes a wavelength conversion wheel 100, an excitation light source device 200, a light valve 300, and a projection lens 500. The excitation light source device 200 is adapted to provide an excitation light beam $I_1$. In the embodiment, the excitation light source device 200 is, for example, a laser light source. However, in other embodiments, the excitation light source device 200 may also be a light-emitting diode (LED), LED array or another light source. The light beam emitted from the excitation light source device 200 is, for example, blue light beam but may also be a light beam of another color, which is not limited in the invention.

The excitation light beam $I_1$ emitted from the excitation light source device 200 is irradiated on the wavelength conversion wheel 100 disposed on a transmission path of the excitation light beam $I_1$. The wavelength conversion wheel 100 is adapted to convert the excitation light beam $I_1$ to generate a conversion light beam $I_2$ of a different wavelength. The wavelength conversion wheel 100 is, for example, a device such as a phosphor wheel or a fluorescence wheel that converts the excitation light beam $I_1$ of blue color into the conversion light beam $I_2$ of another color, but the invention is not limited hereto.

The conversion light beam $I_2$ exiting the wavelength conversion wheel 100 is then irradiated to the light valve 300. The light valve 300 receives the conversion light beam $I_2$ to generate an image light beam $I_3$. The projection lens 500 is located on a transmission path of the image light beam $I_3$. The projection lens 500 is adapted to receive the image light beam $I_3$ to generate a projection light beam $I_4$ and project the projection light beam $I_4$ out of the projection apparatus 10.

In the embodiment, the light valve 300 is configured to receive the conversion light beam $I_2$ from the wavelength conversion wheel 100 to form the image light beam $I_3$. Specifically, the light valve 300 is, for example, a reflective light modulator such as a Liquid Crystal On Silicon panel (LCoS panel) and a Digital Micro-minor Device (DMD). In an embodiment, the light valve 300 is, for example, a transmissive light modulator such as a transparent liquid crystal panel, an electro-optical modulator, a magneto-optic modulator, an acousto-optic modulator (AOM). However, the invention does not limit the form and the type of the light valve 300. In the embodiment, detailed steps and embodiments of a method of receiving the conversion light beam $I_2$ to form the image light beam $I_3$ by the light valve 300 are sufficiently taught, suggested, and described in the common knowledge of the art and are thus not repeatedly described here.

In the embodiment, the projection lens 500, for example, includes a combination of one or more non-planar optical lenses having diopters, e.g., including various combinations of a biconcave lens, a biconvex lens, a concave-convex lens, a convex-concave lens, a plano-convex lens, and a plano-concave lens. In an embodiment, the projection lens 500 may also include planar optical lenses that project the image light beam $I_3$ from the light valve 300 out of the projection apparatus 10 by reflection or transmission. The invention does not limit the form and the type of the projection lens 500.

Moreover, due to limitations on the process, a wavelength conversion wheel generally includes a plurality of wavelength conversion layers that are attached or coated on a substrate in segment forms, and a gap generally exists on a boundary between two adjacent wavelength conversion layers. Namely, the gap does not have a fluorescence powder or a phosphor powder, and a wavelength of an excitation light beam irradiated to this gap cannot be converted, which results in a discontinuous conversion light beam when the wavelength conversion wheel rotates. Alternatively, the two adjacent wavelength conversion layers partially overlap on the boundary, and the overlapped region has two fluorescence powders or phosphor powders, such that the excitation light beam irradiating on this overlapped region generates a light beam of an undesired color. In a conventional structure, edges on the boundary of the two adjacent wavelength conversion layers of the wavelength conversion wheel generally extend along a radial direction (i.e., a direction perpendicular to an axial direction) of the wavelength conversion wheel, and a long axis of an excitation light spot irradiated by the excitation light beam to the wavelength conversion wheel also extends along the radial direction of the wavelength conversion wheel, such that the excitation light spot of the excitation light beam on the wavelength conversion wheel has a high overlap ratio with the gap on the boundary of the two wavelength conversion layers, which causes the conversion light beam to have a high discontinuity rate. In the embodiments below, some examples of the wavelength conversion wheel will be described, and the wavelength conversion wheel of the embodiments effectively decreases the discontinuity rate of the emission of the conversion light beam or decreases a ratio of the conversion light beam of an undesired color.

Figure 1:
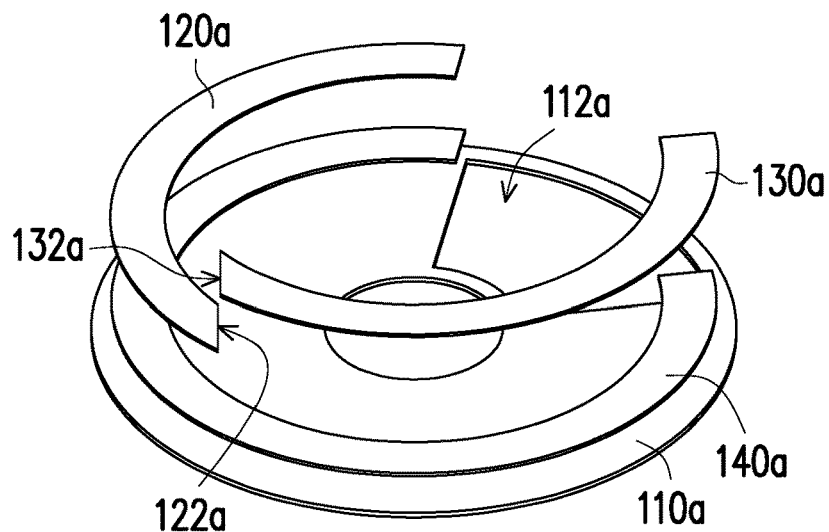
FIG. 1 is a schematic diagram illustrating component configuration of a wavelength conversion wheel according to an embodiment of the invention.
Figure 2:
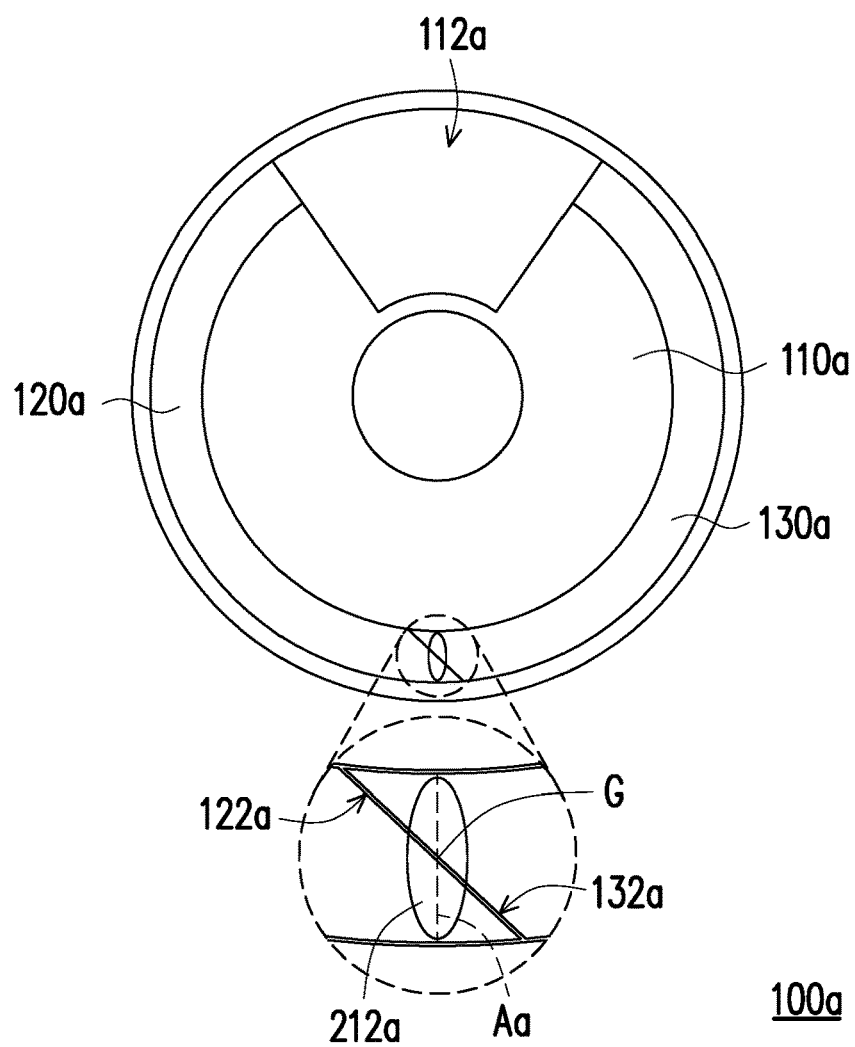
FIG. 2 is a front view and a partially enlarged schematic diagram illustrating the wavelength conversion wheel shown in FIG. 1.

FIG. 1 is a schematic diagram illustrating component configuration of a wavelength conversion wheel according to an embodiment of the invention. For ease of illustration, locations of a first wavelength conversion layer 120a and a second wavelength conversion layer 130a are moved upward in the drawing, and a reflection layer 140a is exposed to clearly show the configurational relationships among each of the components. In fact, the first wavelength conversion layer 120a and the second wavelength conversion layer 130a are disposed on the reflection layer 140a. FIG. 2 is a front view and a partially enlarged schematic diagram illustrating the wavelength conversion wheel shown in FIG. 1. In FIG. 2, the first wavelength conversion layer 120a and the second wavelength conversion layer 130a are already stacked on the reflection layer 140a, and the reflection layer 140a is not shown.

Referring to FIG. 1 and FIG. 2, the wavelength conversion wheel 100 in FIG. 6 may be a wavelength conversion wheel 100a of the embodiment, wherein the wavelength conversion wheel 100a includes a substrate 110a, the first wavelength conversion layer 120a, and the second wavelength conversion layer 130a. In the embodiment, a material of the substrate 110a is, for example, aluminum, or another material having excellent thermal conductivity, and the substrate 110a is able to constantly dissipate heat while the excitation light beam $I_1$ is irradiated on the wavelength conversion layers of the wavelength conversion wheel 100a for a long time. Moreover, the substrate 110a has a rotation central axis (not illustrated) located in a central circular region of the wavelength conversion wheel 100a in FIG. 2. The rotation central axis of the substrate 110a is connected to a driving apparatus (not illustrated) such as a motor, and the substrate 110a is adapted to be driven by the driving apparatus to rotate with the rotation central axis as a center.

In the embodiment, the wavelength conversion wheel 100a further has a light transmissive region 112a, and the first wavelength conversion layer 120a, the second wavelength conversion layer 130a, and the light transmissive region 112a are respectively located on a region close to an edge of the wavelength conversion wheel 100a and are disposed adjacent to each other along a circumferential direction. The light transmissive region 112a is, for example, a diffusion light transmissive plate fit with the substrate 110a or a through-hole on the substrate 110a to allow the excitation light beam $I_1$ to directly pass through the wavelength conversion wheel 100a. However, in other embodiments, it is also possible that the wavelength conversion wheel 100a does not have the light transmissive region 112a.

Moreover, in the embodiment, the first wavelength conversion layer 120a and the second wavelength conversion layer 130a include the fluorescence powder, and the components in the fluorescence powder in the first wavelength conversion layer 120a and the second wavelength conversion layer 130a may be identical or different. In addition, the first wavelength conversion layer 120a and the second wavelength conversion layer 130a are manufactured, for example, as Phosphor-in-Glass (PIG) or Phosphor-in-Silicon (PIS), but the manufacturing method of the first wavelength conversion layer 120a and the second wavelength conversion layer 130a is not limited hereto. The first wavelength conversion layer 120a and the second wavelength conversion layer 130a may be fixed on the substrate 110a by coating or attaching, but the fixing method is not limited hereto.

In the embodiment, as shown in FIG. 2 and FIG. 6, when the substrate 110a of the wavelength conversion wheel 100a rotates about the rotation central axis, the first wavelength conversion layer 120a, the second wavelength conversion layer 130a, and the light transmissive region 112a are sequentially rotated into the transmission path of the excitation light beam $I_1$. When sequentially irradiated on the first wavelength conversion layer 120a and the second wavelength conversion layer 130a on the wavelength conversion wheel 100a, the excitation light beam $I_1$ respectively excites the fluorescent materials in the first wavelength conversion layer 120a and the second wavelength conversion layer 130a and causes energy transition in the fluorescent materials, and the excitation light beam $I_1$ is converted into the different or identical conversion light beam $I_2$, wherein a wavelength of the conversion light beam $I_2$ is greater than a wavelength of the excitation light beam $I_1$.

In the embodiment, the wavelength conversion wheel 100a includes two wavelength conversion layers (i.e., the first wavelength conversion layer 120a and the second wavelength conversion layer 130a) as an example. And the excitation light beam respectively excites the fluorescent materials in the first wavelength conversion layer 120a and the second wavelength conversion layer 130a to be respectively converted into two different conversion light beam $I_2$. However, in other embodiments, the wavelength conversion wheel 100a may include three or even more wavelength conversion layers, and the invention does not limit the number of the wavelength conversion layers.

In the embodiment, a special design is specifically provided on the boundary of the first wavelength conversion layer 120a and the second wavelength conversion layer 130a to effectively decrease the discontinuity rate of the emission of the conversion light beam $I_2$. The first wavelength conversion layer 120a is disposed on the substrate 110a and has a first end 122a. The second wavelength conversion layer 130a is disposed on the substrate 110a and has a second end 132a. The second end 132a of the second wavelength conversion layer 130a is closely adjacent to the first end 122a of the first wavelength conversion layer 120a, and there is a boundary G formed between the first end 122a of the first wavelength conversion layer 120a and the second end 132a of the second wavelength conversion layer 130a. Moreover, an edge of the first end 122a and an edge of the second end 132a are complementary in shape. In the embodiment, the first wavelength conversion layer 120a and the second wavelength conversion layer 130a are disposed to be annularly adjacent on the substrate 110a, and the boundary G formed between the edge of the first end 122a and the edge of the second end 132a is not parallel to the radial direction of the substrate 110a, wherein the radial direction is perpendicular to an extension direction of the rotation central axis. An included angle between an extension direction of the boundary G and the radial direction is greater than 0 degrees and smaller than 90 degrees. In other embodiments, with the second end of the second wavelength conversion layer being closely adjacent to the first end of the first wavelength conversion layer, the second end may partially cover the first end, or the first end may partially cover the second end, and the overlapped portion which is covered by the first end and the second end is also the boundary, but the invention is not limited hereto.

Referring to FIG. 2 and FIG. 6, the excitation light beam $I_1$ is irradiated on the wavelength conversion wheel 100a and forms an excitation light spot 212a. Generally, the excitation light spot 212a has a long axis Aa, and the long axis Aa of the excitation light spot 212a is parallel to the radial direction of the substrate 110a. In other words, an extension direction of the long axis Aa is perpendicular to the extension direction of the rotation central axis. In the embodiment, when the excitation light beam $I_1$ (FIG. 6) is irradiated on the boundary G formed between the edge of the first end 122a and the edge of the second end 132a and forms the excitation light spot 212a, a direction of the boundary G formed between the edge of the first end 122a and the edge of the second end 132a is not parallel to the long axis Aa of the excitation light spot 212a. An included angle between the direction of the long axis Aa of the excitation light spot 212a and the boundary G is greater than 0 degrees and smaller than 90 degrees. Compared to a conventional projection apparatus where the direction of the long axis of the excitation light spot is parallel to the boundary between two wavelength conversion layers, which results in a greater overlapping area between the excitation light spot of the excitation light beam and the gap on the boundary, the design of the embodiment significantly reduces the overlapping area between the excitation light spot 212a and the boundary G and further decreases the discontinuity rate of the emission of the conversion light beam $I_2$ and effectively enhances the quality of the conversion light beam $I_2$. Moreover, when the excitation light beam is irradiated on the overlapped boundary formed between the edge of the first end and the edge of the second end, the ratio of generated light beams of mixed colors is also decreased.

In addition, as shown in FIG. 1, the wavelength conversion wheel 100a of the embodiment includes the reflection layer 140a, wherein the reflection layer 140a is disposed between the first wavelength conversion layer 120a, the second wavelength conversion layer 130a, and the substrate 110a, and a material of the reflection layer 140a is a mixture of titanium dioxide and silicon or glass, or a mixture of silicon dioxide and silicon or glass, and may of course be another material that easily reflects or scatters light. When the excitation light beam $I_1$ excites the fluorescent material in the first wavelength conversion layer 120a and the second wavelength conversion layer 130a and is converted into the conversion light beam $I_2$, the reflection layer 140a reflects or scatters the generated conversion light beam $I_2$.

Figure 3:
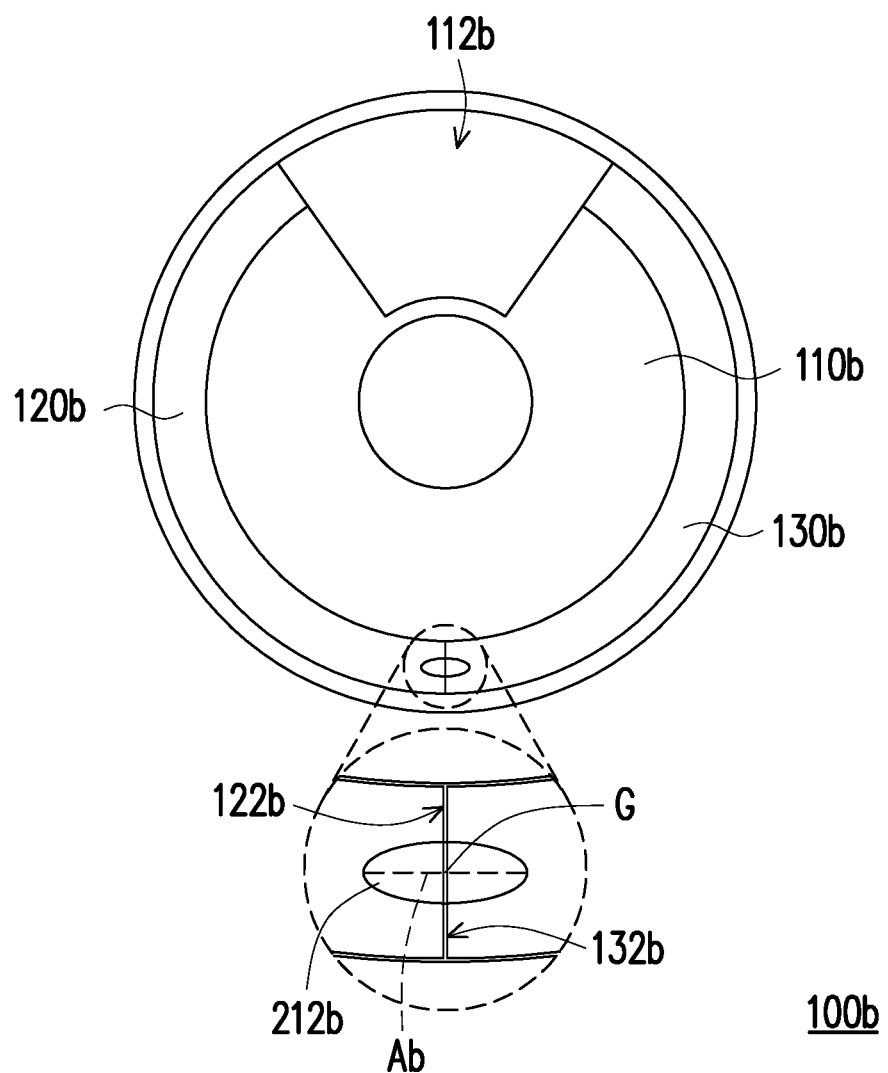
FIG. 3 is a front view and a partially enlarged schematic diagram illustrating a wavelength conversion wheel according to another embodiment of the invention.

FIG. 3 is a front view and a partially enlarged schematic diagram illustrating a wavelength conversion wheel according to another embodiment of the invention. Referring to both FIG. 2 and FIG. 3, the wavelength conversion wheel 100 in FIG. 6 may also be a wavelength conversion wheel 100b of the embodiment, and the wavelength conversion wheel 100b of the embodiment is similar to the wavelength conversion wheel 100a of FIG. 2. The difference between the two wheels lies in: the excitation light beam $I_1$ emitted from the excitation light source device 200 (FIG. 6) irradiates and foil is a excitation light spot 212b on a surface close to a circumferential edge of the wavelength conversion wheel 100b of the embodiment, and a direction of a long axis Ab of the excitation light spot 212b is set to be perpendicular to a radial direction of a substrate 110b. Through such design of the long axis direction of the excitation light spot 212b, even an extension direction of a boundary G formed between a first end 122b of a first wavelength conversion layer 120b and a second end 132b of a second wavelength conversion layer 130b of the wavelength conversion wheel 100b is parallel to the radial direction of the substrate 110b, when the excitation light beam $I_1$ (FIG. 6) is irradiated on the boundary G formed between an edge of the first end 122b and an edge of the second end 132b and forms the excitation light spot 212b, the direction of the boundary G formed between the edge of the first end 122b and the edge of the second end 132b is perpendicular to the long axis Ab of the excitation light spot 212b. The excitation light spot 212b of the excitation light beam $I_1$ (FIG. 6) and the gap on the boundary G have a smaller overlapping area, which effectively decreases the discontinuity rate of the emission of the conversion light beam $I_2$ and further enhances the quality of the conversion light beam $I_2$.

In the embodiment, a method of adjusting the long axis direction of the excitation light spot 212b may involve directly rotating a direction of the excitation light source device 200, or rotating the excitation light spot 212b through a configuration of an optical component (e.g., a prism) disposed between the excitation light source device 200 and the wavelength conversion wheel, and the invention is not limited hereto.

Figure 4:
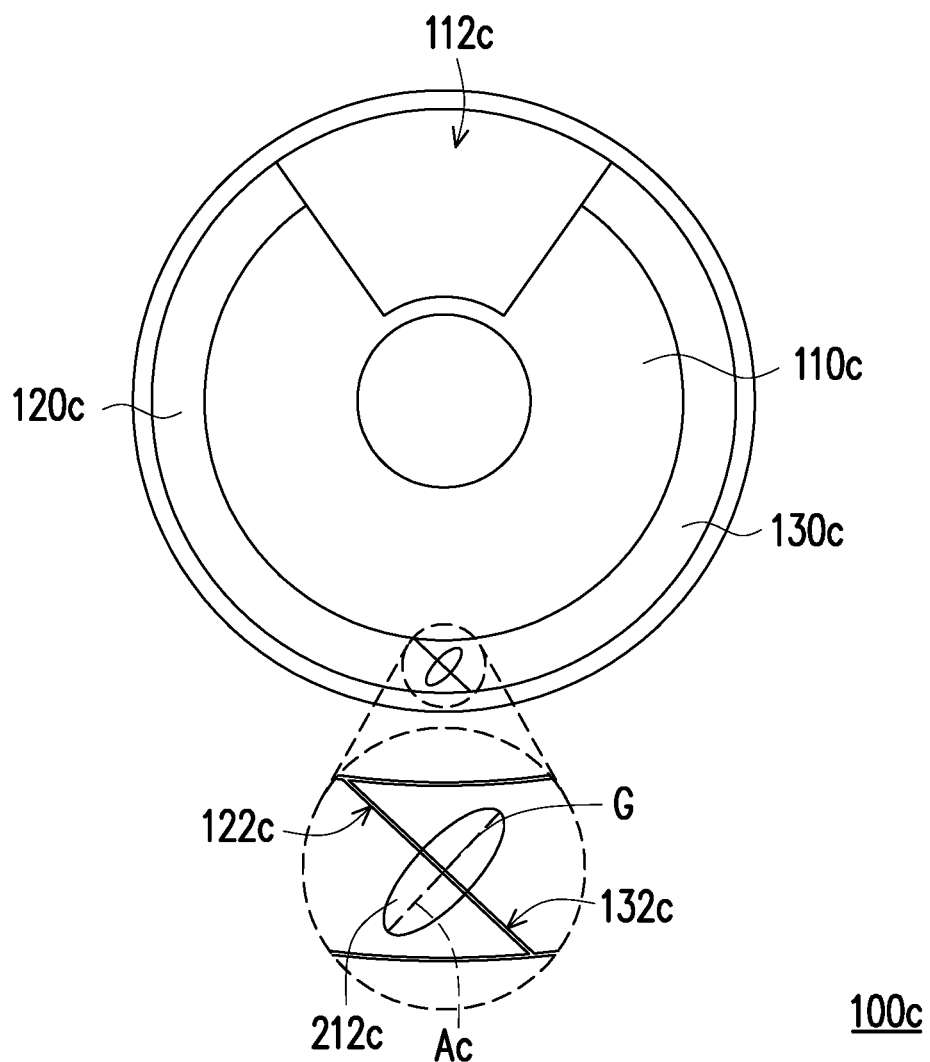
FIG. 4 is a front view and a partially enlarged schematic diagram illustrating a wavelength conversion wheel according to another embodiment of the invention.

FIG. 4 is a front view and a partially enlarged schematic diagram illustrating a wavelength conversion wheel according to another embodiment of the invention. Referring to both FIG. 2 and FIG. 4, the wavelength conversion wheel 100 in FIG. 6 may also be a wavelength conversion wheel 100c of the embodiment, and the wavelength conversion wheel 100c of the embodiment is similar to the wavelength conversion wheel 100a of FIG. 2. The difference between the two wheels lies in: the boundary G formed between a first end 122c of a first wavelength conversion layer 120c and a second end 132c of a second wavelength conversion layer 130c is not parallel to a radial direction of a substrate 110c of the wavelength conversion wheel 100c. The excitation light beam $I_1$ emitted from the excitation light source device 200 irradiates and forms an excitation light spot 212c on a surface close to a circumferential edge of the wavelength conversion wheel 100c of the embodiment, and a direction of a long axis Ac of the excitation light spot 212c is not parallel to an extension direction of a boundary G. In the embodiment, when the excitation light beam $I_1$ (FIG. 6) is irradiated on the boundary G formed between an edge of the first end 122c and an edge of the second end 132c and forms the excitation light spot 212c, the direction of the long axis Ac of the excitation light spot 212c is, for example, perpendicular to the extension direction of the boundary G, but the invention is not limited hereto. The design of the embodiment also decreases the discontinuity rate of the emission of the conversion light beam $I_2$ and further enhances the quality of the conversion light beam $I_2$.

Figure 5:
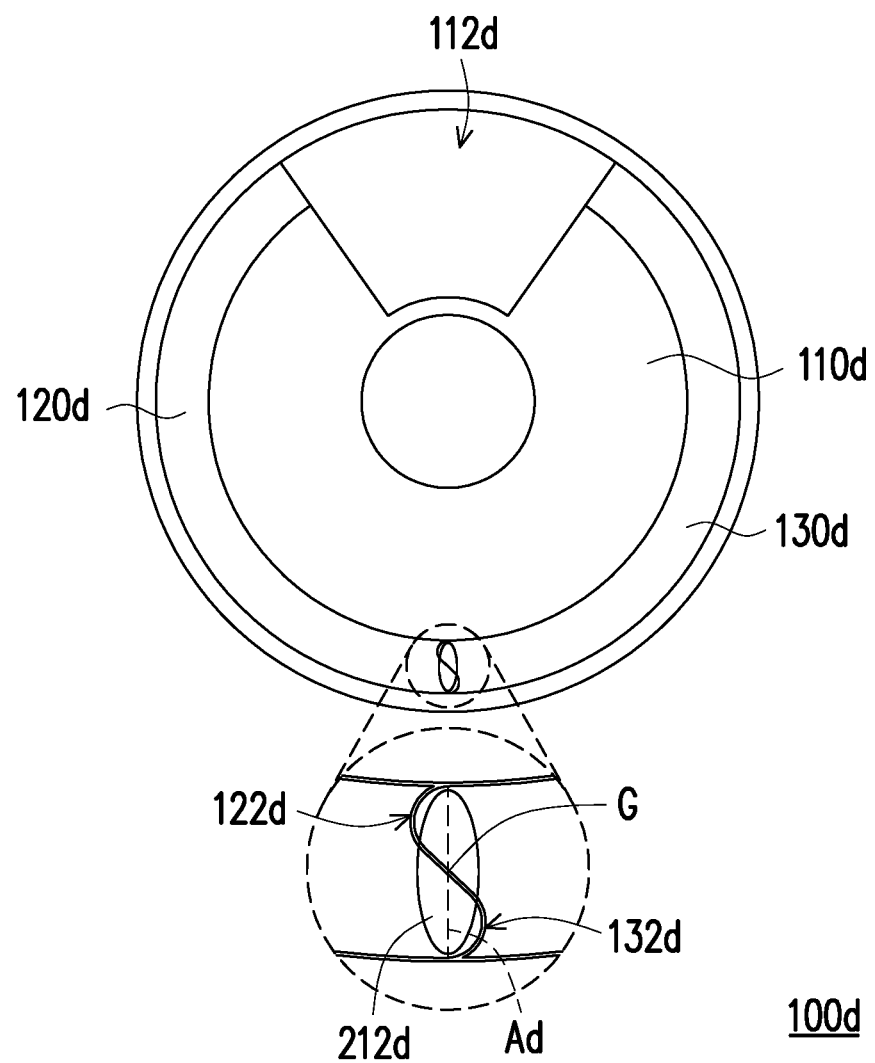
FIG. 5 is a front view and a partially enlarged schematic diagram illustrating a wavelength conversion wheel according to another embodiment of the invention.

FIG. 5 is a front view and a partially enlarged schematic diagram illustrating a wavelength conversion wheel according to another embodiment of the invention. Referring to both FIG. 2 and FIG. 5, the wavelength conversion wheel 100 in FIG. 6 may also be a wavelength conversion wheel 100d of the embodiment, and the wavelength conversion wheel 100d of the embodiment is similar to the wavelength conversion wheel 100a of FIG. 2. The difference between the two wheels lies in: a first end 122d of a first wavelength conversion layer 120d and a second end 132d of a second wavelength conversion layer 130d of the wavelength conversion wheel 100d of the embodiment are curves complementary in shape, such that a boundary G formed in the embodiment is in a curved shape, e.g., an S shape, but the shape of the boundary G is not limited hereto. The excitation light beam $I_1$ emitted from the excitation light source device 200 of FIG. 6 irradiates and forms an excitation light spot 212d on a surface of the wavelength conversion wheel 100d. A long axis Ad of the excitation light spot 212d is parallel to a radial direction of the substrate 110d. In other words, an extension direction of the long axis Ad is perpendicular to the extension direction of the rotation central axis. In other embodiments, the boundary G may also be in an irregular shape or may be a combination of a straight line and a curved line. Similarly, through the design of the embodiment, the excitation light spot 212d of the excitation light beam $I_1$ (FIG. 6) and the gap on the boundary G have a smaller overlapping area, which effectively decreases the discontinuity rate of the emission of the conversion light beam $I_2$ and further enhances the quality of the conversion light beam $I_2$.

In summary of the above, in the design of the wavelength conversion wheel of some embodiments of the invention, the second end of the second wavelength conversion layer is closely adjacent to the first end of the first wavelength conversion layer, the edge of the first end and the edge of the second end are complementary in shape, and the boundary formed between the edge of the first end and the edge of the second end is not parallel to the radial direction of the substrate. Or the boundary formed between the edge of the first end and the edge of the second end is not parallel to the direction of the long axis of the excitation light spot formed by the excitation light beam. Accordingly, the overlapping area of the boundary between the first wavelength conversion layer and the second wavelength conversion layer and the excitation light spot irradiated by the general excitation light beam on the boundary can be reduced, which decreases the discontinuity rate of the emission of the conversion light beam and further enhances the quality of the conversion light beam and the performance of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion wheel comprising: a substrate, a first wavelength conversion layer, and a second wavelength conversion layer, wherein
    the substrate has a rotation central axis and is adapted to rotate about the rotation central axis,
    the first wavelength conversion layer is disposed on the substrate and has a first end,
    the second wavelength conversion layer is disposed on the substrate and has a second end, wherein the second end is closely adjacent to the first end, an edge of the first end and an edge of the second end are complementary in shape, and a boundary formed between the edge of the first end and the edge of the second end is not parallel to a radial direction of the substrate, wherein the radial direction is perpendicular to an extension direction of the rotation central axis, and
    a gap exists between the edge of the first end and the edge of the second end, or the edge of the first end and the edge of the second end overlap with each other.

2. The wavelength conversion wheel according to claim 1, wherein an included angle between an extension direction of the boundary and the radial direction is greater than 0 degrees and smaller than 90 degrees.

3. The wavelength conversion wheel according to claim 1, wherein the edge of the first end and the edge of the second end are respectively in a straight line shape.

4. The wavelength conversion wheel according to claim 1, wherein the edge of the first end and the edge of the second end are respectively in a curved line shape.

5. A projection apparatus comprising: an excitation light source, a wavelength conversion wheel, a light valve, and a projection lens, the wavelength conversion wheel comprising a substrate, a first wavelength conversion layer, and a second wavelength conversion layer, wherein
    the substrate has a rotation central axis and is adapted to rotate about the rotation central axis,
    the excitation light source is configured to provide an excitation light beam,
    the wavelength conversion wheel is disposed on an optical path of the excitation light beam, wherein the first wavelength conversion layer is disposed on the substrate and has a first end,
    the second wavelength conversion layer is disposed on the substrate and has a second end, wherein the first wavelength conversion layer and the second wavelength conversion layer are configured to convert the excitation light beam into a conversion light beam, wherein the second end is closely adjacent to the first end, an edge of the first end and an edge of the second end are complementary in shape, and a boundary formed between the edge of the first end and the edge of the second end is not parallel to a radial direction of the substrate, wherein the radial direction is perpendicular to an extension direction of the rotation central axis,
    the light valve is disposed on a transmission path of the conversion light beam and receives the conversion light beam to form an image light beam,
    the projection lens is disposed on a transmission path of the image light beam and receives the image light beam to form a projection light beam, and the boundary is not parallel to a direction of a long axis of an excitation light spot irradiated by the excitation light beam on the boundary.

6. The projection apparatus according to claim 5, wherein an included angle between the direction of the long axis of the excitation light spot and the boundary is greater than 0 degrees and smaller than 90 degrees.

7. The projection apparatus according to claim 5, wherein an included angle between an extension direction of the boundary and the radial direction is greater than 0 degrees and smaller than 90 degrees.

8. The projection apparatus according to claim 5, wherein the edge of the first end and the edge of the second end are respectively in a straight line shape.

9. The projection apparatus according to claim 5, wherein the edge of the first end and the edge of the second end are respectively in a curved line shape.

10. A projection apparatus comprising: an excitation light source, a wavelength conversion wheel, a light valve, and a projection lens, the wavelength conversion wheel comprising a substrate, a first wavelength conversion layer, and a second wavelength conversion layer, wherein the substrate has a rotation central axis and is adapted to rotate about the rotation central axis, the excitation light source is configured to provide an excitation light beam, the wavelength conversion wheel is disposed on an optical path of the excitation light beam, wherein the first wavelength conversion layer is disposed on the substrate and has a first end, the second wavelength conversion layer is disposed on the substrate and has a second end, wherein the first wavelength conversion layer and the second wavelength conversion layer are configured to convert the excitation light beam into a conversion light beam, wherein the second end is closely adjacent to the first end, an edge of the first end and an edge of the second end are complementary in shape, and a boundary formed between the edge of the first end and the edge of the second end is not parallel to a radial direction of the substrate, wherein the radial direction is perpendicular to an extension direction of the rotation central axis, the light valve is disposed on a transmission path of the conversion light beam and receives the conversion light beam to form an image light beam, the projection lens is disposed on a transmission path of the image light beam and receives the image light beam to form a projection light beam, and a gap exists between the edge of the first end and the edge of the second end, or the edge of the first end and the edge of the second end overlap with each other.

* * * * *